(No Model.)
J. E. CARVER.
COMBINED FEEDER AND BREAKER FOR COTTON GINS.
No. 260,661. Patented July 4, 1882.
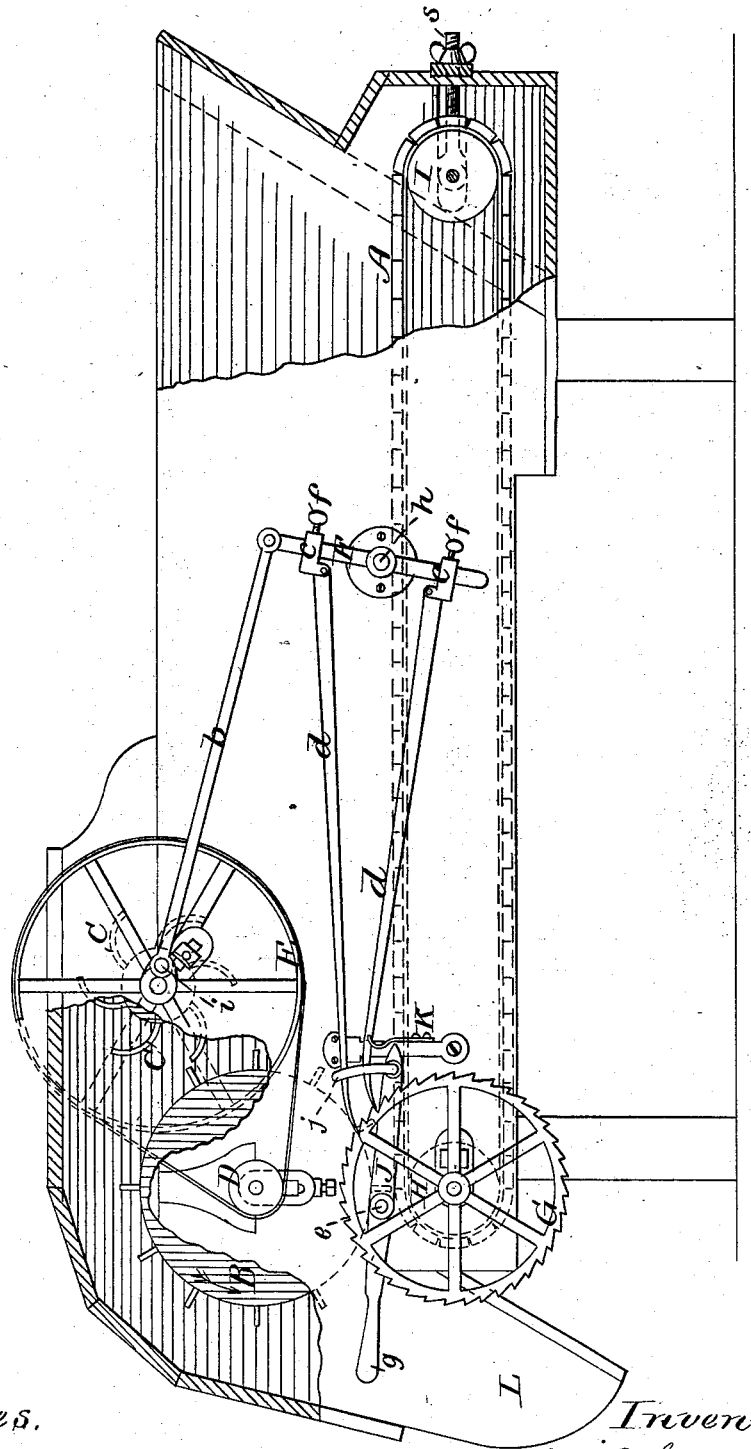
Witnesses.
H. E. Moore
B. O'Hara
Inventor,
Jos. E. Carver.
by J. H. Adams
Atty.

UNITED STATES PATENT OFFICE.

JOSEPH E. CARVER, OF BRIDGEWATER, MASSACHUSETTS, ASSIGNOR TO THE EAGLE COTTON GIN COMPANY, OF SAME PLACE.

COMBINED FEEDER AND BREAKER FOR COTTON-GINS.

SPECIFICATION forming part of Letters Patent No. 260,661, dated July 4, 1882.

Application filed May 16, 1881. (No model.)

*To all whom it may concern:*

Be it known that I, JOSEPH E. CARVER, of Bridgewater, in the county of Plymouth and State of Massachusetts, have invented a new and useful Improvement in Combined Feeder and Breaker for Cotton-Gins, of which the following is a specification.

In harvesting cotton a large portion of the crop is of necessity gathered with the bolls in order to secure the whole crop, and the object of my invention is to prepare the cotton gathered in this manner for ginning and deliver it to the gin. Machines have heretofore been made for this purpose; but they are objectionable on account of their complication of construction and expense, which have prevented their being brought into common use.

My invention consists of a machine which shall be simple in construction and effective as a feeder, and at the same time be capable of breaking the bolls sufficiently to allow of the cotton being ginned upon a machine of suitable character and construction.

The accompanying drawing represents a side elevation of a machine embodying my invention, parts of the same being shown as broken away to expose the interior of the machine.

A is an endless apron supported upon drums H I, and such as is commonly used in a gin-feeder, and forms the bottom of my machine, and upon which the cotton is placed.

B is the breaking and feeding cylinder, which carries the cotton over it and drops it into the passage L to be delivered to the gin. In ordinary feeders this cylinder is provided with sharp points or teeth, which are usually directed forward and pick up the cotton and carry it over the cylinder and drop it into the gin. In my machine the cylinder is provided with strong, blunt teeth, and to this cylinder is imparted a speed six times greater than that given to an ordinary feeder.

At the rear of the cylinder B, and somewhat above the level of the center of the same, and revolving in the same direction, is a cylinder, C, of about one-half of the diameter of the cylinder B, and rotating at one-sixth of its rate of speed. The teeth of cylinder C are longer than those of cylinder B, and curve backward and rotate opposite the spaces between the teeth of cylinder B. The exact curve required for the teeth of cylinder C is the arc of a circle described from the surface of the cylinder, the tangent of said arc being the radius from the center to the circumference of the cylinder. Now, when the apron is covered with cotton and the machine put in operation the cotton is carried under the cylinder C, but is not taken up by its teeth, and is carried against the teeth of cylinder B, and is prevented from rising and being thrown back by the cylinder C. The cotton is then carried over and in front of cylinder B, the pressure of the cotton upon the apron and the reflexed teeth of cylinder C being sufficient to break the bolls apart, but not enough to break or injure the hulls, by which are meant the detached segments of the cotton-bolls.

Motion is imparted to the cylinder B by means of a belt passing around a pulley, E, on cylinder C, and a pulley, D, on the shaft of cylinder B.

F is a rocker-beam journaled on a shaft, $h$, and motion is imparted to the said rocker-beam by means of a connecting-rod, $b$, keyed to the shaft of cylinder C. Upon the rocker-beam F are two sliding boxes, $c\ c$, which are held in place by means of thumb-screws $f\ f$.

To the sliding boxes $c\ c$ are pivoted the dogs $d\ d$, which extend forward and engage with the ratchet-wheel G, which is attached to the forward drum H, over which the apron A passes. By adjusting the sliding boxes $c\ c$ nearer together or farther apart on the rocker-bar F the speed of the apron A may be increased or lessened, as desired. It will be seen that the sliding boxes $c\ c$ can be moved independently each of the other, so that the difference can be regulated from one tooth to eight on the ratchet-wheel, and that either or both boxes and their connecting-dogs can be moved and regulated while the machine is in operation. The forward ends of the dogs $d\ d$ pass through a slotted guide, $j$, by which they are held in proper position. The guide $j$ is attached to the end of a lever, J, pivoted at $e$, and having a handle, $g$. K is a spring having a curve at its upper end, and is designed to hold the lever J in place. When it is desired to stop the motion of the apron A the handle $g$ of lever J is depressed, which action raises the guide $j$ and lifts the ends of the dogs $d\ d$ off from the ratchet-wheel G, and this is effected without stopping the rest of the machine. The end of lever J when raised is held in an elevated position on the upper end of the curved spring K.

I am aware that cylinders provided with teeth and revolving in a contrary direction to other toothed cylinders or against stationary combs have long been used for breaking cotton-bolls. I am also aware that a feeding-cylinder and retaining-cylinder have been used in connection with an endless apron; but it is believed that mine is the first machine in which the cotton has been presented by an apron to the under side of a breaking-cylinder, and the first machine in which a breaking-cylinder has been made to perform the double duty of breaking the bolls and feeding the cotton directly to the gin.

I am also aware that pawls attached to adjustable nuts on a right and left hand screw-threaded rod are not new, the same being shown in Patent No. 239,380; but

What I claim as my invention is—

1. The combination of the endless apron A, retaining-cylinder C, provided with curved teeth, and the breaking and feeding cylinder B, said cylinders being driven at different rates of speed, as and for the purpose specified.

2. The combination, with the dogs $d\ d$, of the sliding boxes $c\ c$ on the rocker-beam F, and made adjustable independently of each other, substantially as and for the purpose specified.

3. The combination of the lever J, slotted guide $j$, spring-holder K, and dogs $d\ d$, substantially as and for the purpose set forth.

In testimony whereof I have signed my name to this specification in the presence of two subscribing witnesses.

JOSEPH E. CARVER.

Witnesses:
LEWIS HOLMES,
SAML. P. GATES.